March 13, 1934.  W. R. JOHNSON  1,950,729
ASPARAGUS CUTTING MACHINE
Filed June 30, 1930  3 Sheets-Sheet 1

INVENTOR
W. R. Johnson
BY
ATTORNEY

March 13, 1934.  W. R. JOHNSON  1,950,729
ASPARAGUS CUTTING MACHINE
Filed June 30, 1930   3 Sheets-Sheet 2
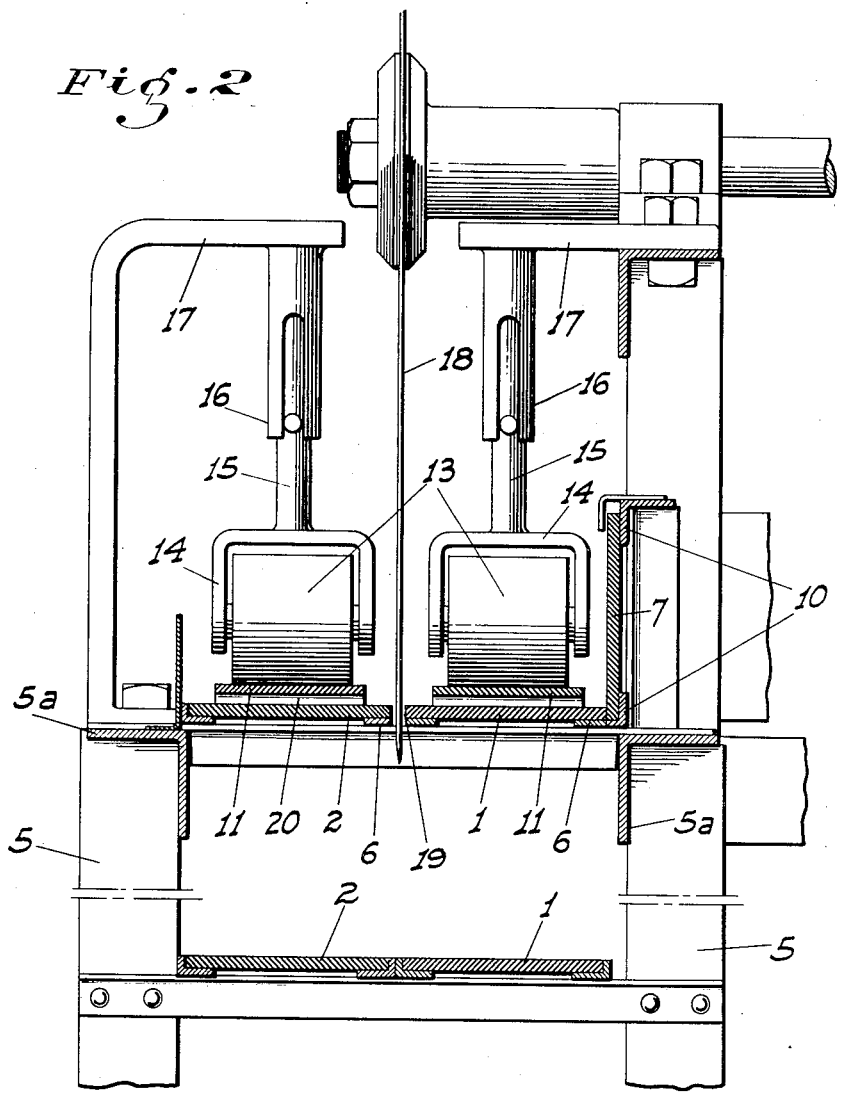
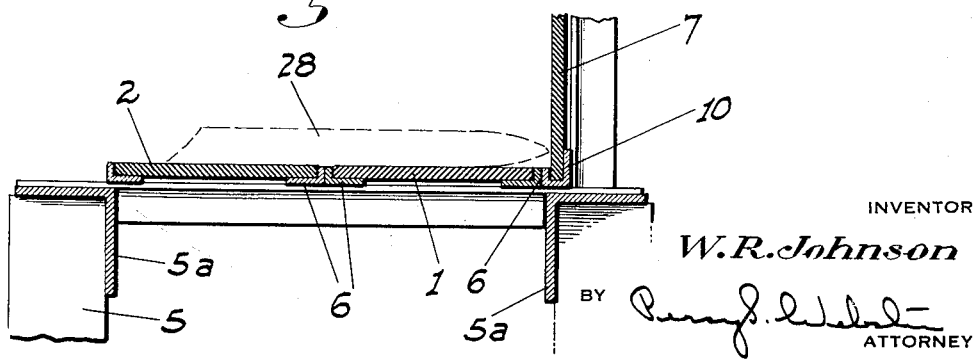
INVENTOR
W. R. Johnson
BY
ATTORNEY March 13, 1934.   W. R. JOHNSON   1,950,729
ASPARAGUS CUTTING MACHINE
Filed June 30, 1930   3 Sheets-Sheet 3
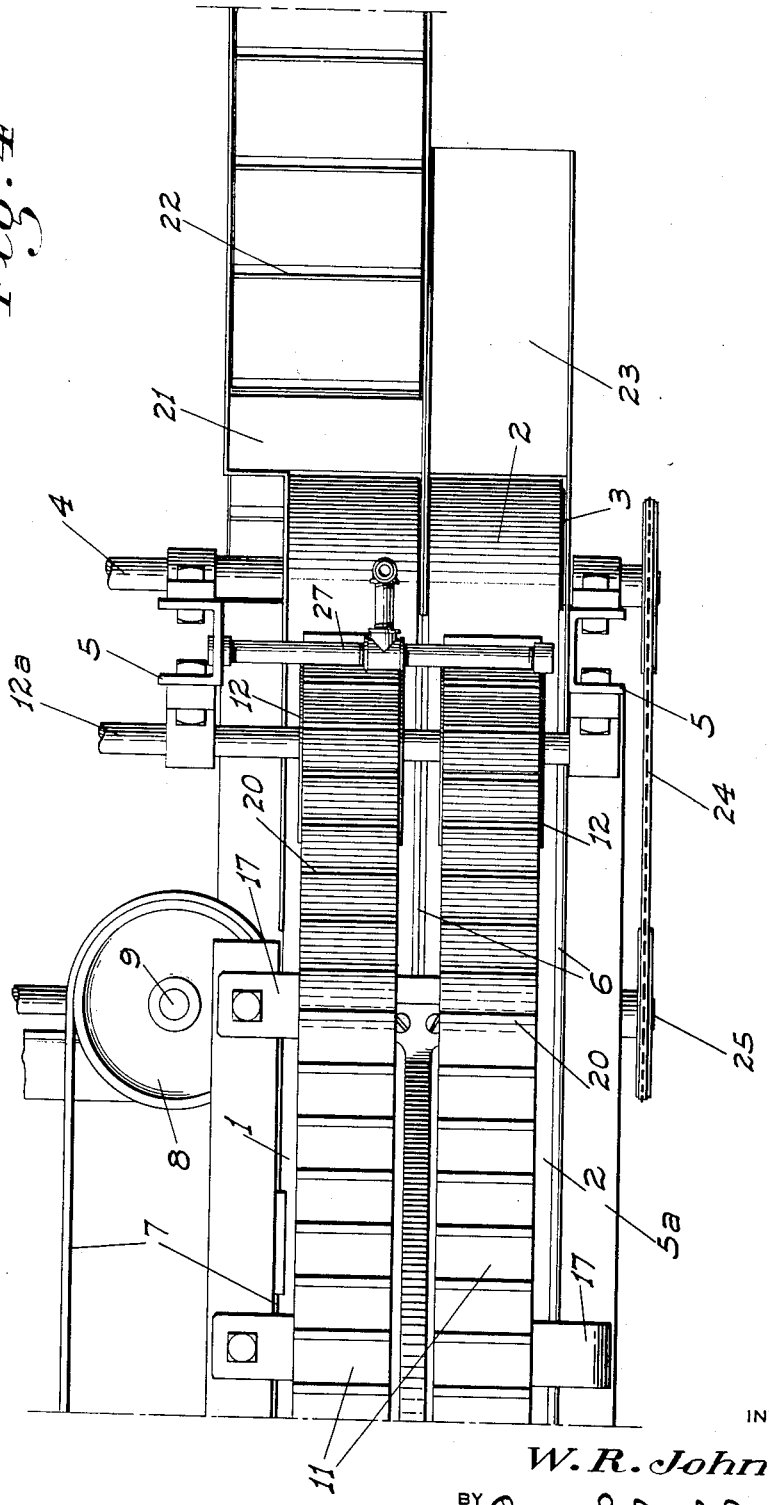
INVENTOR
W. R. Johnson
BY
ATTORNEY Patented Mar. 13, 1934

1,950,729

UNITED STATES PATENT OFFICE 1,950,729

ASPARAGUS CUTTING MACHINE

Will R. Johnson, Stockton, Calif., assignor to Richmond-Chase Company, San Jose, Calif., a corporation Application June 30, 1930, Serial No. 464,798

2 Claims. (Cl. 146—81)

This invention relates to machines for cutting the butt ends from asparagus stalks prior to canning the same. My principal object is to provide a machine for the purpose so constructed and arranged as to insure that all the stalks when thus cut will be the same length, and that the cut will be at right angles to the length of the stalk, with a minimum of attention on the part of the operators who feed the asparagus to the machine being necessary to attain the desired ends, and without the possibility of the asparagus being bruised or otherwise damaged during its passage through the machine.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Fig. 2 is a fragmentary enlarged transverse section of the machine on the line 2—2 of Fig. 1.

Fig. 3 is a similar view on the line 3—3 of Fig. 1.

Fig. 4 is a fragmentary top plan view of the machine at its discharge end.

Figure 1:
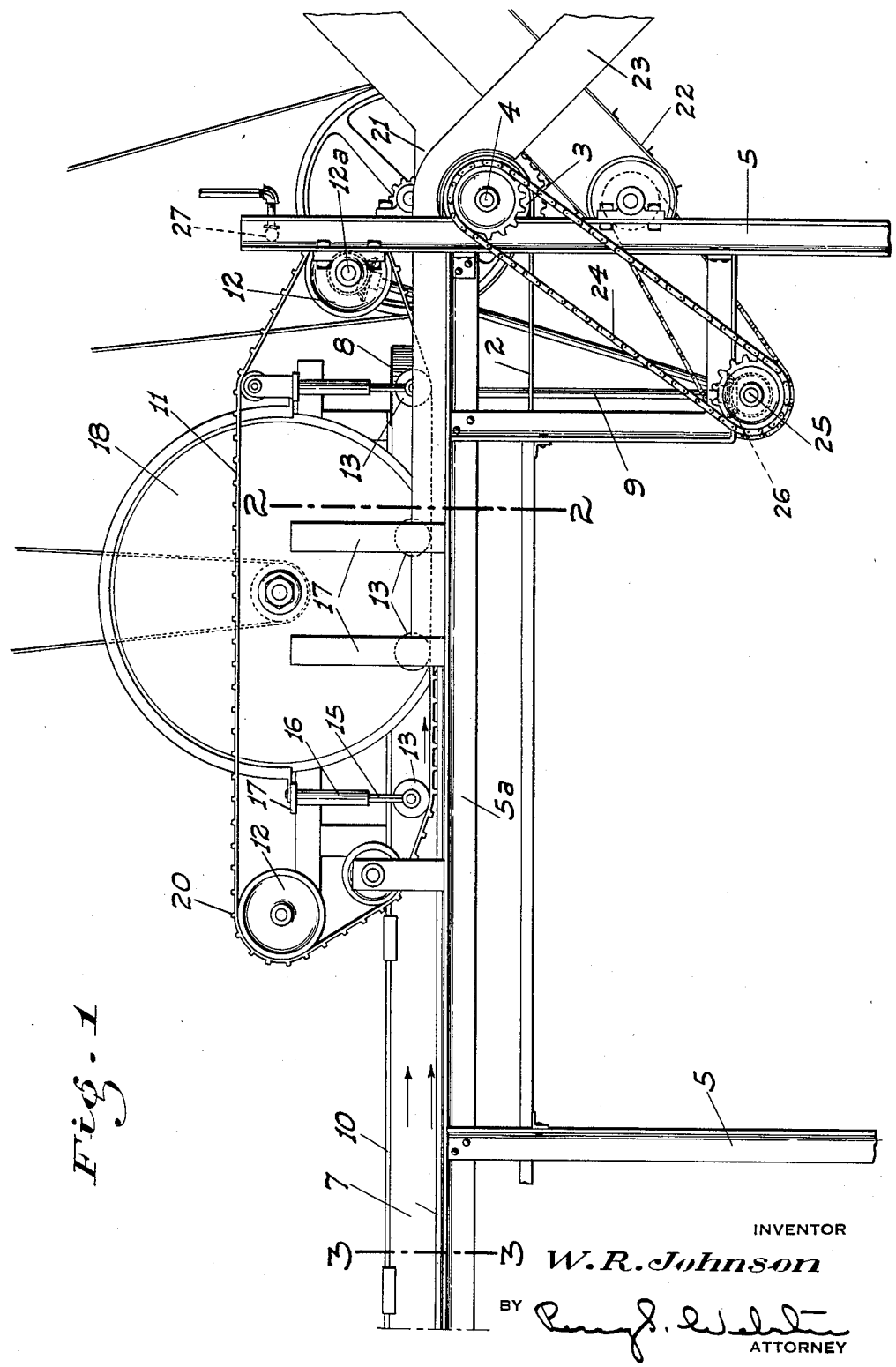
Fig. 1 is a side elevation of my improved asparagus cutting machine.

Referring now more particularly to the characters of reference on the drawings, the numerals 1 and 2 denote a pair of horizontally disposed and transversely separated smooth surfaced belts, the upper runs of which serve as a supporting and conveying means for the asparagus stalks. These belts pass about their pulleys, one of which is shown at 3, whose shaft 4 is journaled on the adjacent uprights 5 of the supporting frame of the machine which includes horizontal side beams 5a. The upper runs of the belt are supported against downward deflection by rails 6 mounted in connection with the frame, which rails are also provided with upstanding side flanges, not higher than the thickness of the belts, to hold said belts against lateral deflection.

Another smooth surfaced belt 7 extends lengthwise of the belts 1 and 2 with its width disposed in a vertical plane. One run of this belt is disposed adjacent the outer edge of the belt 1 and projects upwardly from the same. This belt is also mounted on end pulleys, one of which is shown at 8, the shaft 9 of said pulley depending downwardly therefrom and being journaled in connection with the main frame. The run of the belt 7 adjacent the belt 1 is held against transverse movement away from said belt 1 by back flanges 10; the lower edge of said belt riding on a rail formed with the adjacent back flange, as shown in Figs. 2 and 3.

Superimposed over the belts 1 and 2 for a relatively short portion of the length of the same and adjacent one end thereof are horizontally disposed transversely spaced endless belts 11 which pass over end pulleys 12 journaled in connection with the frame. These belts are transversely parallel with the belts 1 and 2 and the upper surface of the lower run of each belt is engaged at intervals by longitudinally spaced rollers 13. These rollers are supported by yokes 14 having upstanding stems 15 slidable in sleeves 16. These sleeves depend from supporting bars 17 fixed in connection with the main frame in any suitable manner. The rollers are relatively heavy and act to normally maintain the lower runs of the belts close against the upper runs of the belts 1 and 2. A circular cutting disc 18 whose axis extends transversely of and above the belts 1 and 2, projects between the belts 11 intermediate the ends of the latter. The lower edge of the disc also projects between the belts 1 and 2 and depends below the upper runs of the same; a slot 19 for the passage of this portion of the disc being provided between the intermediate rails 6. The outer surfaces of the belts 11 are provided with transversely extending cleats 20 spaced a certain distance apart and preferably formed integral with the belts.

At its end nearest the belts 11 the belt 1 discharges into the hopper 21 with which an upwardly extending elevator 22 is associated; while the adjacent end of the belt 2 discharges into a downwardly extending chute 23. The elevator preferably leads to and discharges onto a distributing and grading mechanism such as is shown in my co-pending applications for patent, Serial No. 458,069, filed May 31, 1930, and Serial No. 459,696, filed June 7, 1930. The chute 23 on the other hand merely delivers to any suitable bin or other receptacle so as to discharge the cut-off chutes in a manner making them easily disposed of.

For reasons which will be seen later it is desired that all belts shall travel at the same speed and in the same direction. This driving is accomplished by any suitable means. In the arrangement herein shown, the shaft 4 is connected by a chain drive 24 to another transverse shaft 25 which is directly under the shaft 9 and is connected in driving relation thereto by bevel gearing 26. The shaft 12a of one pair of pulleys 12 is also connected to the shaft 25 in driving relation therewith by suitable gearing connections. One of these shafts is driven from a suitable source of power, the shaft 4 being shown as being employed for that purpose in the present instance. The connecting means between the above mentioned shafts are such that they will all rotate at the same speed and the belt pulleys thereon are all the same diameter, so that the speed of the various belts will be the same. The pulleys of course turn in that direction so that the upper runs of the belts 1 and 2, the lower runs of the belts 11, and the front run of the belt 7 all move in the same direction, or toward the end hopper and chute. To keep the belts in a properly lubricated condition so that they will not have excessive friction on their supporting rails I provide a transverse drip pipe 27 mounted in superimposed relation to the belts at any convenient point and so that water from said pipe will drip onto the belts 11 as well as onto the belts 1 and 2.

In operation the operators place the asparagus stalks 28 in the form of a single layer onto the belts 1 and 2 ahead of the belts 11, with the tips or blossom ends against the belt 7 and so that said stalks are substantially at right angles to the longitudinal plane of the belt. The belts 1 and 2, together are sufficiently wide to support the stalks for their entire length, and the end portions of the stalks therefore rest on the belt 1, while the butt end portions rest on the belt 2. Since the supporting and locating or back-stop belt 7 travels at the same speed there is no tendency for the stalks to be shifted in position once they are placed on the belts, nor is there any tendency for the relatively delicate tips to be bruised by rubbing contact with the back-stop member, as would be the case if said member were a stationary part. As the stalks pass under the adjacent ends of the belts 11 they are received between transverse cleats 20 of said belts, which engage the stalks on their sides and act to place the same positively at right angles to the belts should they be slightly misalined. This avoids the necessity of the operators having to exercise extreme care in initially placing the stalks on the belt in proper alinement. The sets of cleats on both belts 11 are initially alined with each other, and since said belts both travel at the same speed said cleats will always retain such alinement. As the stalks pass under the belt 11 they raise the same somewhat against the downward pressure of the rollers 13, which of course lift the necessary distance. The stalks are therefore held between the belts with a yieldable pressure sufficient to hold them firm while they are being engaged by the cutting disc without the danger of said stalks being actually pressed out of shape. Since the belts 11 are of course flexible and are engaged at intervals by the independently yieldable rollers 13, said belts are perfectly free to flex when stalks of different diameters are engaged with said belts at the same time, as is very apt to be the case, without danger of a large stalk being subjected to a greater holding pressure than a small one. Also owing to the fact that the belts 11, and the corresponding pressing rollers are separated from and independent of each other, the pressure on any stalk is the same at both ends of the same regardless of the fact that the stalk is apt to be thinner or smaller at its tip end than at its butt end. One end or the other of the stalk therefore is not pressed down more than the other.

The transverse distance between the front run of the vertical belt 7 and the cutting disc 18 determines the length of the portion of the stalks to be retained and canned, and since the stalks are disposed against said belt when cut all the stalks as cut will obviously be the same length. To insure the tips being thus limited, even though the operators may not actually abut the tips against said vertical belt 7 when initially placing the stalks in position, said belt, along the portion of the same where the stalks are initially placed, is somewhat further from the adjacent edge of the belt 1 than along that portion of said belt 7 where it is transversely alined with the belts 11, as shown in Figs. 2 and 3. By this means, as long as the tip ends of the stalks overhang the back edge of the belt 1 when being initially placed, they will be positively alined with said edge by the transverse shifting action of the belt 7 on the stalks as said belt approaches the edge of the belt 1 and engages the tips. After the cutting disc has severed the stalks the butt and waste ends remain segregated from the remaining portions of the stalks, and are carried along by the belt 2 and are finally deposited into the chute 23.

The remaining portions of the stalk remain on the belt 1 and are deposited in the hopper 21, to be conveyed thence to the grading mechanism by the conveyor 22.

While I have here shown the belts as being of a solid or non-foraminous type, it is to be understood that I may utilize mesh or foraminous belting if desired, as in such cases where it is desired to wash the asparagus as it is being conveyed and handled by the cutting machine.

Also, while the belts 11 should have the cleats 20, integral or otherwise, to give the best results and when accuracy of positioning of the asparagus relative to the cutter is desired or necessary, such cleats may at times be omitted and the belt left smooth or plain surfaced, under such conditions of handling the asparagus as render an accurate positioning of the same unnecessary.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. An asparagus cutting machine including spaced horizontal supporting and conveying means for the stalks to be cut, said stalks being disposed on said means at right angles to the longitudinal plane and direction of travel of the same, a cutting disc associated with and mounted to operate in the space between the conveying means to cut through the supported stalks intermediate their ends, endless belts supported above and parallel to the conveying means disposed on both sides of the disc and extending ahead of and beyond the axial plane of the same some distance, the lower runs of said belts being adjacent the conveying means, longitudinally spaced rollers engaging the upper surfaces of the lower runs of said belts, and separate supporting means for each roller to permit the same to move vertically.

2. In an asparagus cutting machine a horizontal conveyor belt to carry the asparagus to the cutter, a rigid angle rail extending lengthwise of the belt along one edge thereof, the bottom flange of the rail being below the horizontal plane of the belt, and the side flange being spaced from the edge of the belt to form a channel between the two, a second belt adapted to run longitudinally of and at substantially right angles to the first belt, the bottom edge of one run of the second belt traveling in said channel and supported on such edge by the bottom flange of the rail and held from lateral deflection relative to the first belt by the side flange of the rail.

WILL R. JOHNSON.